(12) United States Patent
Kim et al.

(10) Patent No.: US 12,529,154 B2
(45) Date of Patent: Jan. 20, 2026

(54) ELECTRODE FOR ELECTROLYSIS

(71) Applicant: LG Chem, Ltd., Seoul (KR)

(72) Inventors: Myung Hun Kim, Daejeon (KR); Yeon Yi Kim, Daejeon (KR); Hee Jun Eom, Daejeon (KR); Dong Chul Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 711 days.

(21) Appl. No.: 17/621,532

(22) PCT Filed: Dec. 16, 2020

(86) PCT No.: PCT/KR2020/018446
§ 371 (c)(1),
(2) Date: Dec. 21, 2021

(87) PCT Pub. No.: WO2021/125786
PCT Pub. Date: Jun. 24, 2021

(65) Prior Publication Data
US 2022/0349075 A1  Nov. 3, 2022

(30) Foreign Application Priority Data
Dec. 19, 2019  (KR) .................. 10-2019-0170676

(51) Int. Cl.
| | | |
|---|---|---|
| *C25B 11/093* | (2021.01) | |
| *C25B 1/04* | (2021.01) | |
| *C25B 1/26* | (2006.01) | |
| *C25B 11/052* | (2021.01) | |
| *C25B 11/061* | (2021.01) | |
| *C25B 11/091* | (2021.01) | |

(52) U.S. Cl.
CPC .............. *C25B 11/093* (2021.01); *C25B 1/04* (2013.01); *C25B 1/26* (2013.01); *C25B 11/052* (2021.01); *C25B 11/061* (2021.01); *C25B 11/091* (2021.01)

(58) Field of Classification Search
CPC ....... C25B 11/093; C25B 11/061; C25B 1/26; C25B 1/04; C25B 11/052; C25B 11/091
See application file for complete search history.

(56) References Cited

U.S. PATENT DOCUMENTS

| | | | | |
|---|---|---|---|---|
| 4,132,609 A | * | 1/1979 | Bush .................. | C25D 7/065 |
| | | | | 204/206 |
| 2004/0151896 A1 | | 8/2004 | Houda et al. | |
| 2005/0183952 A1 | * | 8/2005 | Shimamune ........ | C23C 18/1216 |
| | | | | 204/290.01 |
| 2006/0231387 A1 | | 10/2006 | Houda et al. | |
| 2008/0230380 A1 | * | 9/2008 | Ohsaka ................. | C25B 1/04 |
| | | | | 204/290.08 |
| 2012/0199473 A1 | | 8/2012 | Antozzi et al. | |
| 2013/0153411 A1 | | 6/2013 | Ishimaru | |
| 2013/0330651 A1 | * | 12/2013 | Thompsett .......... | H01M 4/8657 |
| | | | | 429/525 |
| 2017/0247269 A1 | | 8/2017 | Tan et al. | |
| 2019/0211464 A1 | * | 7/2019 | Jung ................... | C23C 18/08 |
| 2021/0189575 A1 | * | 6/2021 | Kim .................... | C25B 11/061 |

FOREIGN PATENT DOCUMENTS

| | | | | |
|---|---|---|---|---|
| AU | 2010305403 A1 | * | 3/2012 | ............. C23C 18/08 |
| CN | 107051431 A | | 8/2017 | |
| CN | 109790634 A | | 5/2019 | |
| EP | 3492631 A1 | | 6/2019 | |
| JP | 2003277966 A | | 10/2003 | |
| JP | 2003277967 A | | 10/2003 | |
| JP | 2006193768 A | | 7/2006 | |
| JP | 2006265649 A | | 10/2006 | |
| JP | 2006299395 A | | 11/2006 | |
| JP | 5006456 B2 | | 8/2012 | |
| JP | 2017535675 A | | 11/2017 | |
| JP | 2019531407 A | | 10/2019 | |
| KR | 20030080536 A | * | 10/2003 | ........... C25B 11/093 |
| KR | 100523591 B1 | | 10/2005 | |
| KR | 101710346 B1 | | 2/2017 | |
| KR | 20190036711 A | | 4/2019 | |
| KR | 101950465 B1 | | 5/2019 | |
| WO | 2020009473 A1 | | 1/2020 | |

OTHER PUBLICATIONS

Chemistry of the Elements' Second Edition., 1997, Greenwood & Earnshaw, pp. 1227, 1232-1239, 1245-1248. ;ISBN 978-0-7506-3365-9 (Year: 1997).*
Search Report dated Nov. 21, 2023 from the Office Action for Chinese Application No. 202080046784.5 issued Nov. 23, 2023, 2 pages.
International Search Report for Application No. PCT/KR2020/018446 mailed Apr. 7, 2021, 3 pages.
Extended European Search Report for Application No. 20903271.3 dated Sep. 21, 2022. 8 pgs.

* cited by examiner

*Primary Examiner* — James Lin
*Assistant Examiner* — Kevin Sylvester
(74) *Attorney, Agent, or Firm* — Lerner David LLP

(57) ABSTRACT

The present technology relates to an electrode for electrolysis which has a coating layer containing an ytterbium oxide, wherein the electrode for electrolysis of the present technology is characterized by exhibiting excellent durability and improved overvoltage. Further, the present technology relates to a method of preparing an electrode for electrolysis which includes: applying a coating composition on at least one surface of a metal base, and coating by drying and heat-treating the metal base on which the coating composition has been applied, wherein the coating composition includes a ruthenium precursor and an ytterbium precursor.

7 Claims, No Drawings

ELECTRODE FOR ELECTROLYSIS

CROSS-REFERENCE TO RELATED APPLICATIONS

The present application is a national phase entry under 35 U.S.C. § 371 of International Application No. PCT/KR2020/018446, filed on Dec. 16, 2020, which claims priority from Korean Patent Application No. 10-2019-0170676, filed on Dec. 19, 2019, the disclosures of which are incorporated by reference in their entirety.

TECHNICAL FIELD

The present invention relates to an electrode for electrolysis which may improve overvoltage and a method of preparing the same.

BACKGROUND ART

Techniques for producing hydroxides, hydrogen, and chlorine by electrolysis of low-cost brine, such as sea water, are widely known. Such an electrolysis process is also called a chlor-alkali process, and may be referred to as a process that has already proven its performance and technical reliability in commercial operation for several decades.

With respect to the electrolysis of brine, an ion exchange membrane method, in which an ion exchange membrane is installed in an electrolytic bath to divide the electrolytic bath into a cation chamber and an anion chamber and brine is used as an electrolyte to obtain chlorine gas at an anode and hydrogen and caustic soda at a cathode, is currently the most widely used method.

The electrolysis of brine is performed by reactions as shown in the following electrochemical reaction formulae.

Anodic reaction: $2Cl^- \rightarrow Cl_2 + 2e^-$ ($E^0 = +1.36$ V)
Cathodic reaction: $2H_2O + 2e^- \rightarrow 2OH^- + H_2$ ($E^0 = -0.83$ V)
Total reaction: $2Cl^- + 2H_2O \rightarrow 2OH^- + Cl_2 + H_2$ ($E^0 = -2.19$ V)

In the electrolysis of brine, an overvoltage of the anode, an overvoltage of the cathode, a voltage due to resistance of the ion exchange membrane, and a voltage due to a distance between the anode and the cathode must be considered for an electrolytic voltage in addition to a theoretical voltage required for brine electrolysis, and the overvoltage caused by the electrode among these voltages is an important variable.

Thus, methods capable of reducing the overvoltage of the electrode have been studied, wherein, for example, a noble metal-based electrode called a DSA (Dimensionally Stable Anode) has been developed and used as the anode and development of an excellent material having durability and low overvoltage is required for the cathode.

Stainless steel or nickel has mainly been used as the cathode, and, recently, in order to reduce the overvoltage, a method of using the stainless steel or nickel by coating a surface thereof with nickel oxide, an alloy of nickel and tin, a combination of activated carbon and oxide, ruthenium oxide, or platinum has been studied.

Also, in order to increase activity of the cathode by controlling a composition of an active material, a method of controlling the composition by using a platinum group element, such as ruthenium, and a lanthanide element, such as cerium, has also been studied. However, an overvoltage phenomenon has occurred, and a problem has occurred in which degradation due to reverse current occurs.

DISCLOSURE OF THE INVENTION

Technical Problem

An aspect of the present invention provides an electrode for electrolysis which may reduce overvoltage by improving electrical properties of an electrode surface coating layer.

Technical Solution

According to an aspect of the present invention, there is provided an electrode for electrolysis which includes a metal base layer, and a coating layer containing a ruthenium oxide and an ytterbium oxide, wherein the coating layer is formed on at least one surface of the base layer.

According to another aspect of the present invention, there is provided a method of preparing an electrode for electrolysis which includes the steps of: applying a coating composition on at least one surface of a metal base, and forming coating by drying and heat-treating the metal base on which the coating composition has been applied, wherein the coating composition includes a ruthenium precursor and an ytterbium precursor.

Advantageous Effects

An electrode for electrolysis of the present invention exhibits excellent overvoltage, because an ytterbium oxide contained in a coating layer improves electrical conductivity, and also has excellent basic durability.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Electrode for Electrolysis

The present invention provides an electrode for electrolysis which includes a metal base layer, and a coating layer containing a ruthenium oxide and an ytterbium oxide, wherein the coating layer is formed on at least one surface of the base layer.

The metal base may be nickel, titanium, tantalum, aluminum, hafnium, zirconium, molybdenum, tungsten, stainless steel, or an alloy thereof, and, among these metals, the metal base may preferably be nickel. In the electrode for electrolysis of the present invention, in a case in which the above-described types of metal bases are used, excellent durability and mechanical strength may be provided to the electrode.

In the electrode for electrolysis of the present invention, the coating layer contains a ruthenium oxide. The ruthenium oxide, as an active material, plays a role in providing a ruthenium element to the coating layer, wherein, in a case in which the ruthenium oxide is used in the coating layer of the electrode for electrolysis, a change in electrode performance over time is small while an overvoltage phenomenon is improved, and, subsequently, a separate activation process may be minimized. The ruthenium oxide includes all types of oxides in which the ruthenium element and an oxygen atom are bonded, and, particularly, may be a dioxide or a tetraoxide.

In the electrode for electrolysis of the present invention, the coating layer contains an ytterbium oxide. Since the ytterbium oxide has an excellent electrical conductivity value and is bonded to the ruthenium oxide, it may improve electrical conductivity of the coating layer, and, accordingly, overvoltage of the final electrode for electrolysis may be improved. The ytterbium oxide includes all types of oxides in which an ytterbium element and an oxygen atom are bonded, and, particularly, may be ytterbium(III) oxide ($Yb_2O_3$).

A molar ratio between the ruthenium element and the ytterbium element, which are contained in the coating layer, may be in a range of 100:5 to 100:30, for example, 100:10 to 100:20. In a case in which the molar ratio between the ruthenium element and the ytterbium element, which are contained in the coating layer, is within the above range, an effect of improving the electrical conductivity of the coating layer may be maximized.

In the electrode for electrolysis of the present invention, the coating layer may further contain a platinum group oxide. The platinum group oxide refers to oxides of remaining elements other than the previously described ruthenium among platinum group elements, and, specifically, may be a rhodium oxide, palladium oxide, osmium oxide, iridium oxide or platinum oxide. The platinum group element provided by the platinum group oxide may act as an active material like the ruthenium element, and, in a case in which the platinum group oxide and the ruthenium oxide are included in the coating layer together, it may exhibit a better effect in terms of durability and overvoltage of the electrode. The platinum group oxide includes all types of oxides in which the platinum group element and an oxygen atom are bonded, and, particularly, may be a dioxide or a tetraoxide, and it is desirable that the platinum group oxide is a platinum oxide or iridium oxide.

A molar ratio between the ruthenium element and the platinum group element, which are contained in the coating layer, may be in a range of 100:2 to 100:20, for example, 100:5 to 100:15. In a case in which the molar ratio between the ruthenium element and the platinum group element, which are contained in the coating layer, is within the above-described range, it is desirable in terms of improving the durability and overvoltage, wherein, in a case in which the platinum group element is contained less than the above range, the durability and overvoltage may degrade, and, in a case in which the platinum group element is contained more than the above range, it is disadvantageous in terms of economic efficiency.

In the electrode for electrolysis of the present invention, the catalyst layer may further contain a cerium oxide, and the cerium oxide plays a role in providing a lanthanoid element to the coating layer of the electrode for electrolysis. The cerium element provided by the cerium oxide may minimize a loss of the ruthenium element, as an active material in the catalyst layer of the electrode for electrolysis, during activation or electrolysis by improving the durability of the electrode for electrolysis.

Specifically, during the activation or electrolysis of the electrode for electrolysis, particles containing the ruthenium element in the catalyst layer become a metallic element without changing their structure or are partially hydrated and reduced to active species. In addition, since particles containing the lanthanoid element in the catalyst layer change their structure into a needle shape, the particles act as a protective material that prevents physical detachment of the particles containing the ruthenium element in the catalyst layer, and, as a result, the durability of the electrode for electrolysis may be improved to prevent the loss of the ruthenium element in the coating layer. The cerium oxide includes all types of oxides in which the cerium element and an oxygen atom are bonded, and, particularly, may be an oxide of (II), (III) or (IV).

A molar ratio between the ruthenium element and the cerium element, which are contained in the coating layer, may be in a range of 100:5 to 100:30, for example, 100:10 to 100:20. In a case in which the molar ratio between the ruthenium element and the cerium element, which are contained in the coating layer, is within the above-described range, a balance between the durability and the electrical conductivity of the electrode for electrolysis may be excellent.

Method of Preparing Electrode for Electrolysis.

The present invention provides a method of preparing an electrode for electrolysis which includes the steps of: applying a coating composition on at least one surface of a metal base; and forming coating by drying and heat-treating the metal base on which the coating composition has been applied, wherein the coating composition includes a ruthenium precursor and an ytterbium precursor.

In the method of preparing an electrode for electrolysis of the present invention, the metal base may be the same as the previously described metal base of the electrode for electrolysis.

In the method of preparing an electrode for electrolysis of the present invention, the coating composition may include a ruthenium precursor and an ytterbium precursor. The ruthenium precursor and the ytterbium precursor are converted into oxides by being oxidized in the heat treatment step after the coating.

The ruthenium precursor may be used without particular limitation as long as it is a compound capable of forming a ruthenium oxide, may be, for example, a hydrate, hydroxide, halide, or oxide of ruthenium, and may specifically be at least one selected from the group consisting of ruthenium hexafluoride ($RuF_6$), ruthenium(III) chloride ($RuCl_3$), ruthenium(III) chloride hydrate ($RuCl_3 \cdot xH_2O$), ruthenium(III) bromide ($RuBr_3$), ruthenium(III) bromide hydrate ($RuBr_3 \cdot xH_2O$), ruthenium iodide ($RuI_3$), and ruthenium acetate. When the ruthenium precursors listed above are used, the formation of the ruthenium oxide may be easy.

The ytterbium precursor may be used without particular limitation as long as it is a compound capable of forming an ytterbium oxide, and, for example, the ytterbium precursor may be at least one selected from the group consisting of ytterbium carboxylate, ytterbium nitrate, ytterbium carbonate, ytterbium chloride, ytterbium fluoride, ytterbium oxide, ytterbium sulfonate, and hydrates thereof. Specifically, ytterbium nitrate, ytterbium acetate, ytterbium acetate hydrate, ytterbium chloride, or ytterbium chloride hydrate may be used. When the ytterbium precursors listed above are used, the formation of the ytterbium oxide may be easy.

The coating composition may further include a platinum group precursor for forming a platinum group oxide in the coating layer. The platinum group precursor may be used without particular limitation as long as it is a compound capable of forming a platinum group oxide, may be, for example, a hydrate, hydroxide, halide, or oxide of a platinum group element, and may specifically be at least one platinum precursor selected from the group consisting of chloroplatinic acid hexahydrate ($H_2PtCl_6 \cdot 6H_2O$), diamine dinitro platinum ($Pt(NH_3)_2(NO)_2$), platinum(IV) chloride ($PtCl_4$), platinum(II) chloride ($PtCl_2$), potassium tetrachloroplatinate ($K_2PtCl_4$), and potassium hexachloroplatinate ($K_2PtCl_6$), or may be an iridium precursor such as iridium chloride or iridium chloride hydrate ($IrCl_3 \cdot xH_2O$). When the platinum group precursors listed above are used, the formation of the platinum group oxide may be easy.

The coating composition may further include a cerium precursor for forming a cerium oxide in the coating layer. The cerium precursor may be used without particular limitation as long as it is a compound capable of forming a cerium oxide, may be, for example, a hydrate, hydroxide, halide, or oxide of a cerium element, and may specifically be at least one cerium precursor selected from the group consisting of cerium(III) nitrate hexahydrate ($Ce(NO_3)_3 \cdot 6H_2O$), cerium(IV) sulfate tetrahydrate ($Ce(SO_4)_2 \cdot 4H_2O$), and cerium(III) chloride heptahydrate ($CeCl_3 \cdot 7H_2O$). When the cerium precursors listed above are used, the formation of the cerium oxide may be easy.

In the method of preparing an electrode for electrolysis of the present invention, the coating composition may further include an amine-based additive to provide a strong adhesion between the coating layer and the metal base. Particularly, the amine-based additive may improve a binding force between the ruthenium element, the platinum group element, and the ytterbium element which are contained in the coating layer and may control an oxidation state of the particles containing the ruthenium element to prepare an electrode in a form more suitable for reaction.

The amine-based additive used in the present invention is particularly suitable for use in forming a coating layer due to its high solubility in water while having an amine group. The amine-based additive that may be used in the present invention includes melamine, ammonia, urea, 1-propylamine, 1-butylamine, 1-pentylamine, 1-heptylamine, 1-octylamine, 1-nonylamine, or 1-dodecylamine, and at least one selected from the group consisting thereof may be used.

In the electrode for electrolysis of the present invention, the ruthenium element and the amine-based additive of the coating layer may be included in a molar ratio of 100:10 to 100:50, for example, 100:25 to 100:35. In a case in which the amine-based additive is included less than the above molar ratio range, an effect of improving the binding force by the additive is insignificant, and, in a case in which the amine-based additive is included more than the above molar ratio range, since precipitates may easily occur in a coating liquid, uniformity of the coating may not only be reduced, but the function of the ruthenium oxide may also be hindered.

In the method of preparing an electrode for electrolysis of the present invention, an alcohol-based solvent may be used as a solvent of the coating composition. In a case in which the alcohol-based solvent is used, dissolution of the above-described components is easy, and it is possible to maintain the binding force of each component even in the step of forming the coating layer after the application of the coating composition. Preferably, at least one of isopropyl alcohol and butoxyethanol may be used as the solvent, and, more preferably, a mixture of isopropyl alcohol and butoxyethanol may be used. In a case in which the isopropyl alcohol and the butoxyethanol are mixed and used, uniform coating may be performed in comparison to a case where the isopropyl alcohol and the butoxyethanol are used alone.

In the preparation method of the present invention, the preparation method may include a step of performing a pretreatment of the metal base before performing the coating.

The pretreatment may include the formation of irregularities on a surface of the metal base by chemical etching, blasting or thermal spraying.

The pretreatment may be performed by sandblasting the surface of the metal base to form fine irregularities, and performing a salt or acid treatment. For example, the pretreatment may be performed in such a manner that the surface of the metal base is blasted with alumina to form irregularities, immersed in a sulfuric acid aqueous solution, washed, and dried to form fine irregularities on the surface of the metal base.

The application is not particularly limited as long as the catalyst composition may be evenly applied on the metal base and may be performed by a method known in the art.

The application may be performed by any one method selected from the group consisting of doctor blading, die casting, comma coating, screen printing, spray coating, electrospinning, roller coating, and brushing.

The drying may be performed at 50° C. to 300° C. for 5 minutes to 60 minutes, and may preferably be performed at 50° C. to 200° C. for 5 minutes to 20 minutes.

When the above-described condition is satisfied, energy consumption may be minimized while the solvent may be sufficiently removed.

The heat treatment may be performed at 400° C. to 600° C. for 1 hour or less, and may preferably be performed at 450° C. to 550° C. for 5 minutes to 30 minutes.

When the above-described condition is satisfied, it may not affect strength of the metal base while impurities in the catalyst layer are easily removed.

The coating may be performed by sequentially repeating applying, drying, and heat-treating so that an amount of ruthenium oxide per unit area ($m^2$) of the metal base is 10 g or more. That is, after the catalyst composition is applied on at least one surface of the metal base, dried, and heat-treated, the preparation method according to another embodiment of the present invention may be performed by repeatedly applying, drying, and heat-treating the one surface of the metal base which has been coated with the first catalyst composition.

Hereinafter, the present invention will be described in more detail according to examples and experimental examples, but the present invention is not limited to these examples and experimental examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Material

In the present example, a nickel mesh base (Ni purity of 99% or more, 200 μm) manufactured by Ildong Gold Mesh was used as a metal base, ruthenium(III) chloride hydrate ($RuCl_3 \cdot nH_2O$) was used as a ruthenium precursor, platinum (IV) chloride was used as a platinum group precursor, cerium(III) nitrate hexahydrate ($Ce(NO_3)_3 \cdot 6H_2O$) was used as a cerium precursor, and ytterbium acetate tetrahydrate ($Yb(CH_3COO)_3 \cdot 4H_2O$) was used as a ytterbium precursor. Urea was used as an amine-based additive.

Also, a mixture of 2.375 ml of isopropyl alcohol and 2.375 ml of 2-butoxyethanol was used as a solvent for a coating composition.

Pretreatment of Metal Base

After a surface of the base was blasted with aluminum oxide (White alumina, F120) at a pressure of 0.4 MPa before forming a coating layer on the metal base, the base was put in a 5 M H₂SO₄ aqueous solution heated to 80° C., treated for 3 minutes, and then washed with distilled water to complete a pretreatment.

Example 1

2.41 mmol of ruthenium(III) chloride hydrate, 0.1928 mmol of platinum(IV) chloride, and 0.482 mmol of ytterbium acetate tetrahydrate were sufficiently dissolved for 1 hour in the mixed solvent of the above materials, and 0.045 g of urea was added and mixed to prepare a coating composition. The coating composition was coated on the previously pretreated metal base using a brush, and the coated metal base was put in a convection drying oven and dried at 180° C. for 10 minutes. Thereafter, it was put in an electric heating furnace at 500° C. and was further heat-treated for 10 minutes, and, after the above-described coating, drying, and heat treatment processes were repeated 9 times, an electrode for electrolysis was finally prepared by performing a final heat treatment at 500° C. for 1 hour.

Example 2

An electrode for electrolysis was prepared in the same manner except that 0.241 mmol of cerium(III) nitrate hexahydrate was further added to the coating composition in Example 1 and 0.241 mmol of ytterbium acetate tetrahydrate was added.

Example 3

An electrode for electrolysis was prepared in the same manner except that platinum(IV) chloride was not added to the coating composition in Example 1.

Example 4

An electrode for electrolysis was prepared in the same manner except that platinum(IV) chloride was not added to a coating composition in Example 2.

Example 5

An electrode for electrolysis was prepared in the same manner except that 0.3615 mmol of the cerium precursor and 0.1205 mmol of the ytterbium precursor were added in Example 2.

Example 6

An electrode for electrolysis was prepared in the same manner except that 0.1205 mmol of the cerium precursor and 0.3615 mmol of the ytterbium precursor were added in Example 2.

Comparative Example 1

An electrode for electrolysis was prepared in the same manner except that ytterbium acetate tetrahydrate was not added and 0.482 mmol of cerium(III) nitrate hexahydrate was added in Example 2.

Comparative Example 2

An electrode for electrolysis was prepared in the same manner except that platinum(IV) chloride was not added to a coating composition in Comparative Example 1.

Comparative Example 3

An electrode for electrolysis was prepared in the same manner except that 0.241 mmol of praseodymium(III) chloride (PrCl₃) was added instead of the ytterbium precursor in Example 2.

Comparative Example 4

An electrode for electrolysis was prepared in the same manner except that platinum(IV) chloride was not added to the coating composition in Comparative Example 1, and 0.482 mmol of praseodymium(III) chloride (PrCl₃) was added instead of the cerium precursor.

Molar ratios of components of electrode coating layers prepared in the examples and the comparative examples are summarized in Table 1 below.

TABLE 1

|    | Example 1 | Example 2 | Example 3 | Example 4 | Example 5 | Example 6 | Comparative Example 1 | Comparative Example 2 | Comparative Example 3 | Comparative Example 4 |
|----|-----------|-----------|-----------|-----------|-----------|-----------|-----------------------|-----------------------|-----------------------|-----------------------|
| Ru | 2.41      | 2.41      | 2.41      | 2.41      | 2.41      | 2.41      | 2.41                  | 2.41                  | 2.41                  | 2.41                  |
| Yb | 0.482     | 0.241     | 0.482     | 0.241     | 0.1205    | 0.3615    | —                     | —                     | —                     | —                     |
| Pt | 0.1928    | 0.1928    | —         | —         | 0.1928    | 0.1928    | 0.1928                | —                     | 0.1928                | —                     |
| Ce | —         | 0.241     | —         | 0.241     | 0.3615    | 0.1205    | 0.482                 | 0.482                 | 0.241                 | —                     |
| Pr | —         | —         | —         | —         | —         | —         | —                     | —                     | 0.241                 | 0.482                 |

Experimental Example 1

SEM-EDX Analysis of Coating Layer of Electrode

Components of the electrode coating layers prepared in Example 2 and Comparative Example 1 were analyzed using scanning electron microscope-energy dispersive X-ray spectroscopy (SEM-EDX), and the results thereof are presented in Table 2 below.

TABLE 2

|                       | Ni (wt %) | Ru (wt %) | Ce (wt %) | Pt (wt %) | Yb (wt %) |
|-----------------------|-----------|-----------|-----------|-----------|-----------|
| Example 2             | 10.16     | 43.27     | 12.88     | 12.08     | 21.62     |
| Comparative Example 1 | 24.83     | 42.14     | 15.21     | 15.14     | —         |

From the above results, in Example 2 in which the ytterbium precursor was included in the coating composition, the ytterbium component smoothly formed the electrode coating layer, but, with respect to the comparative example in which the coating was performed with the coating composition not including the ytterbium precursor, it was confirmed that no ytterbium component was detected in the electrode coating layer.

Experimental Example 2

Performance Check of the Prepared Electrodes for Electrolysis

In order to confirm performances of the electrodes prepared in the examples and the comparative examples, a cathode voltage measurement test was performed using half cells in chlor-alkali electrolysis. A 32% NaOH aqueous solution was used as an electrolyte, a platinum (Pt) wire was used as a counter electrode, and a Hg/HgO electrode was used as a reference electrode. After the prepared electrode was put in the electrolyte, the electrode was activated at a constant current density of $-0.62$ $A/cm^2$ for 1 hour, and the performance of each electrode was then compared with a potential value in the first hour. The results thereof are summarized in Table 3 below.

TABLE 3

| Category | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Cathode potential (unit: V) | −1.075 | −1.061 | −1.076 | −1.072 | −1.071 | −1.059 | −1.092 | −1.104 | −1.102 | −1.136 |

From the above results, it was confirmed that an effect of improving overvoltage appeared when the ytterbium oxide was further included in the coating layer. Specifically, when the ytterbium oxide was included in the coating layer, it was confirmed that an electrode for electrolysis having excellent durability may be achieved while performance degradation was suppressed due to excellent electrical conductivity of the ytterbium oxide.

Particularly, with respect to Comparative Examples 3 and 4 using praseodymium corresponding to a lanthanide, the same as ytterbium, performances inferior to those of the examples were found, and, among the examples, performance of Example 6, in which ytterbium having excellent electrical conductivity was used at the highest ratio, was particularly excellent. However, with respect to Example 6, since an amount of cerium was relatively small as an amount of the ytterbium was increased, it was inferior to the other examples in terms of durability and it was confirmed that a portion of the coating layer was peeled off after the electrolysis process.

The invention claimed is:

1. An electrode for electrolysis, the electrode comprising:
a metal base layer; and
a coating layer containing a ruthenium oxide, an ytterbium oxide, a cerium oxide, and a platinum group oxide,
wherein a molar ratio of a ruthenium element to an ytterbium element, which are contained in the coating layer, is in a range of 100:10 to 100:15,
wherein a molar ratio of a ruthenium element to a cerium element, which are contained in the coating layer, is in a range of 100:5 to 100:15,
wherein a molar ratio of a ruthenium element to a platinum group element, which are contained in the coating layer, is in a range of 100:2 to 100:8,
wherein the coating layer is formed on at least one surface of the base layer,
wherein the platinum group oxide is a rhodium oxide, palladium oxide, osmium oxide, iridium oxide or platinum oxide; and
wherein, when the ytterbium oxide is included in the coating layer, the electrode for electrolysis has better durability and performance degradation suppression due to electrical conductivity of the ytterbium oxide that provides for a smooth and particle microstructure as compared to a needle like microstructure that has comparably less electrical conductivity.

2. A method of preparing an electrode for electrolysis according to claim 1, the method comprising:
applying a coating composition on at least one surface of a metal base;
coating by drying and heat-treating the metal base on which the coating composition has been applied;
wherein the coating composition comprises a ruthenium precursor, an ytterbium precursor, a cerium precursor and a platinum group precursor;
wherein a molar ratio of the ruthenium element to the ytterbium element, which are contained in the coating composition, is in the range of 100:10 to 100:15;
wherein a molar ratio of the ruthenium element to the cerium element, which are contained in the coating composition, is in the range of 100:5 to 100:15;
wherein a molar ratio of the ruthenium element to the platinum group element, which are contained in the coating composition, is in the range of 100:2 to 100:8;
and wherein, when the ytterbium oxide is included in the coating layer, the electrode for electrolysis has better durability and performance degradation suppression due to electrical conductivity of the ytterbium oxide that provides for a smooth and particle microstructure as compared to a needle like microstructure that has comparably less electrical conductivity.

3. The method of claim 2, wherein the ruthenium precursor is at least one selected from the group consisting of ruthenium hexafluoride ($RuF_6$), ruthenium (III) chloride ($RuCl_3$), ruthenium (III) chloride hydrate ($RuCl_3 \cdot xH_2O$), ruthenium (III) bromide ($RuBr_3$), ruthenium (III) bromide hydrate ($RuBr_3 \cdot xH_2O$), ruthenium iodide ($RuI_3$), and ruthenium acetate.

4. The method of claim 2, wherein the ytterbium precursor is at least one selected from the group consisting of ytterbium carboxylate, ytterbium nitrate, ytterbium carbonate, ytterbium chloride, ytterbium fluoride, ytterbium oxide, ytterbium sulfonate, and hydrates thereof.

5. The method of claim 2, wherein the platinum group precursor is at least one selected from the group consisting of chloroplatinic acid hexahydrate ($H_2PtCl_6 \cdot 6H_2O$), diamine dinitro platinum ($Pt(NH_3)_2(NO)_2$), platinum (IV) chloride ($PtCl_4$), platinum (II) chloride ($PtCl_2$), potassium tetrachloroplatinate ($K_2PtCl_4$), and potassium hexachloroplatinate ($K_2PtCl_6$).

6. The method of claim 2, wherein the cerium precursor is at least one selected from the group consisting of cerium (III) nitrate hexahydrate ($Ce(NO_3)_3 \cdot 6H_2O$), cerium (IV) sulfate tetrahydrate ($Ce(SO_4)_2 \cdot 4H_2O$), and cerium (III) chloride heptahydrate ($CeCl_3 \cdot 7H_2O$).

7. The method of claim 2, wherein the coating composition further comprises at least one amine-based additive selected from the group consisting of melamine, ammonia, urea, 1-propylamine, 1-butylamine, 1-pentylamine, 1-heptylamine, 1-octylamine, 1-nonylamine, and 1-dodecylamine.

* * * * *